United States Patent
Collins et al.

(10) Patent No.: US 10,570,305 B2
(45) Date of Patent: Feb. 25, 2020

(54) IONOMER-BASED DIGITAL PRINTABLE COATINGS FOR VARIOUS SUBSTRATES

(71) Applicant: Michelman, Inc., Cincinnati, OH (US)

(72) Inventors: Talia McKinney Collins, Lebanon, OH (US); Kenneth Scott Smallwood, Cincinnati, OH (US); Robert Turnbull, Kirtland, OH (US)

(73) Assignee: Michelman, Inc., Cincinnati, OH (US)

( * ) Notice: Subject to any disclaimer, the term of this patent is extended or adjusted under 35 U.S.C. 154(b) by 276 days.

(21) Appl. No.: 15/379,568

(22) Filed: Dec. 15, 2016

(65) Prior Publication Data

US 2017/0174927 A1    Jun. 22, 2017

Related U.S. Application Data

(60) Provisional application No. 62/269,433, filed on Dec. 18, 2015.

(51) Int. Cl.
| | | |
|---|---|---|
| C09D 123/08 | (2006.01) |
| D21H 19/12 | (2006.01) |
| C09D 11/02 | (2014.01) |
| C08F 220/06 | (2006.01) |
| C09D 11/00 | (2014.01) |
| C09D 11/10 | (2014.01) |
| C08F 220/04 | (2006.01) |
| C09D 133/02 | (2006.01) |

(52) U.S. Cl.
CPC ...... *C09D 123/0876* (2013.01); *C08F 220/04* (2013.01); *C08F 220/06* (2013.01); *C09D 11/00* (2013.01); *C09D 11/02* (2013.01); *C09D 11/10* (2013.01); *C09D 133/02* (2013.01); *D21H 19/12* (2013.01)

(58) Field of Classification Search
CPC ............ C09D 123/0867; C09D 133/02; C09D 11/10; C09D 11/02; C08F 220/06; C08F 220/04; F06M 2200/00; F06M 2200/40
See application file for complete search history.

(56) References Cited

U.S. PATENT DOCUMENTS

| | | | |
|---|---|---|---|
| 3,389,109 A | 6/1968 | Harmon et al. | |
| 3,872,039 A | 3/1975 | Vaughn et al. | |
| 3,899,389 A | 8/1975 | Vaughn et al. | |
| 4,181,566 A | 1/1980 | Vaughn et al. | |
| 5,175,054 A * | 12/1992 | Chu | C08J 7/047 264/210.7 |
| 5,206,279 A * | 4/1993 | Rowland | C08F 8/44 524/379 |
| 5,387,635 A | 2/1995 | Rowland et al. | |
| 5,789,123 A | 8/1998 | Cleckner et al. | |
| 6,482,886 B1 * | 11/2002 | Finlayson | D06M 15/11 427/326 |
| 9,085,123 B2 * | 7/2015 | Echt | C09D 129/04 |
| 9,796,869 B2 * | 10/2017 | Echt | B32B 27/10 |
| 2004/0055720 A1 | 3/2004 | Torras, Sr. et al. | |
| 2007/0238833 A1 | 10/2007 | Leboeuf et al. | |
| 2008/0044666 A1 | 2/2008 | Anderson et al. | |
| 2012/0118785 A1 | 5/2012 | Kainz et al. | |
| 2013/0225749 A1 * | 8/2013 | Echt | C08L 29/04 524/501 |
| 2015/0203704 A1 | 7/2015 | Hayes | |

FOREIGN PATENT DOCUMENTS

| | | |
|---|---|---|
| EP | 0789281 A2 | 8/1997 |
| WO | 2006055176 A1 | 5/2006 |
| WO | 2010036273 A1 | 4/2010 |
| WO | 2015114070 A1 | 8/2015 |

OTHER PUBLICATIONS

International Search Report and Written Opinion dated Mar. 3, 2017 pertaining to International application No. PCT/US2016/066763.
Guideline for using DigiPrime 1500LA; www.michelman.com; 2 pages.

* cited by examiner

*Primary Examiner* — Sanza L. McClendon
(74) *Attorney, Agent, or Firm* — Vorys, Sater, Seymour and Pease LLP

(57) ABSTRACT

Various embodiments provided herein include a primer coating formulation that includes an aqueous dispersion comprising a metal salt and a copolymer of ethylene and one or more acid-based monomers. Also described are embodiments of an aqueous dispersion including a blend a co-binder and ethylene copolymerized with an acid-based monomer neutralized to form an ionomer. Embodiments provided herein also provide a method including applying to a substrate an aqueous dispersion comprising ethylene copolymerized with an acid-based monomer neutralized to form an ionomer.

14 Claims, No Drawings

IONOMER-BASED DIGITAL PRINTABLE COATINGS FOR VARIOUS SUBSTRATES

CROSS-REFERENCE TO RELATED APPLICATIONS

This patent application claims priority to U.S. Provisional Patent Application Ser. No. 62/269,433, filed Dec. 18, 2015, and entitled "Ionomer-Based Digital Printable Coatings for Various Substrates," which is hereby incorporated by reference in its entirety.

TECHNICAL FIELD

The present specification relates to digital print primers, and more particularly to digital print primer coating formulations including ionomer-based aqueous dispersions of one or more copolymers of ethylene and a carboxylic acid.

BACKGROUND

In recent years, the use of on-demand digital printing machines utilizing electrophotographic systems has become widespread. In such systems, toner images are formed on a photosensitive drum and then electrically transferred onto an intermediate transfer blanket or belt for printing on a paper or polymeric film sheet or web. Toner formulations contain toner particles and solvents which keep the toner particles from becoming airborne. Conventionally, the solvents in these systems are removed either by evaporation prior to the transfer of toner to the substrate surface or by drying after the toner has been transferred. For example, a thermal offset blanket cylinder may be placed between the photosensitive image drum and the substrate surface which is supported on the backside by an impression drum. The toner is heated by the offset blanket cylinder to melt the toner into a uniform blend and to subsequently evaporate the solvent when the offset blanket cylinder transfers the toner onto the substrate surface.

Toner adhesion failure may result from one or more of various mechanisms. For example, the toner may fail to adhere to the substrate surface when there is no fusion step to fix the toner to the substrate surface. In another example, there may be an incomplete transfer of the toner to the substrate surface, leaving a residue on the offset blanket cylinder which translates into blanket life failure. Toners do not transfer well and/or adhere well to such films or paper substrates unless the substrates have been treated with a coating or primer ("optimized") to enhance the adhesion of toners.

Primer coatings have been employed to promote adhesion of toners to paper or polymeric film substrates. Conventional ethylene-acrylic acid copolymer-based coatings used to enhance the adhesion of toner to paper and polymeric substrates often utilize an additional pre-coating.

Accordingly, there is a need in the art for a primer coating which provides toner adhesion to a variety of polymeric and non-polymeric substrates without the need for the application of additional pre-coatings, is stable, easy to handle, and meets the revised blanket compatibility requirement to achieve the highest rating.

SUMMARY

Various embodiments provided herein include a primer coating formulation that includes an aqueous dispersion comprising a metal salt and a copolymer of ethylene and one or more acid-based monomers.

Also described are embodiments of an aqueous dispersion including a blend a co-binder and ethylene copolymerized with an acid-based monomer neutralized to form an ionomer.

Embodiments provided herein also provide a method including applying to a substrate an aqueous dispersion comprising ethylene copolymerized with an acid-based monomer neutralized to form an ionomer.

Additional features and advantages will be set forth in the detailed description which follows, and in part will be readily apparent to those skilled in the art from that description or recognized by practicing the embodiments described herein, including the detailed description which follows and the claims.

It is to be understood that both the foregoing general description and the following detailed description describe various embodiments and are intended to provide an overview or framework for understanding the nature and character of the claimed subject matter.

DETAILED DESCRIPTION

Reference will now be made in detail to various embodiments of ionomer-based primer coatings. In general, various embodiments provide an ionomer-based primer coating that enhances toner adhesion to a variety of substrates without the need for a pre-coating. The primer coating may be used on a wide variety of substrates such as paper, films, and nonwovens. The coating may provide enhanced toner adhesion to such substrates and may enable substrates to achieve superior performance for ink adhesion and blanket compatibility certification. In particular, various embodiments enable the coating to be used on cellulose-based substrates (such as paper) that to date have presented electrophotographic printing challenges beyond those presented by polymeric-based films. Accordingly, various embodiments provide improved toner adhesion to a variety of polymeric and non-polymeric substrates, including paper, without the need for the application of additional pre-coatings. Additionally, various embodiments may lead to increased blanket life in blanket transfer driven applications due to higher melt points.

Unless otherwise indicated, the disclosure of any ranges in the specification and claims are to be understood as including the range itself and also anything subsumed therein, as well as endpoints.

Embodiments of the present disclosure are directed to primer coatings comprising an ionic copolymer for use with a variety of substrates. Suitable substrates include, but are not limited to, paper (including art paper, coated paper, and paper board), film, nonwovens, and the like. As used herein, "film" refers to a substrate made of an organic resin such as viscose, acetate, polyethylene, polypropylene, poly(vinyl chloride), polystyrene, nylon, polycarbonate, poly(ethylene terephthalate) or poly(butylene terephthalate). As used herein, "nonwoven" refers to a substrate which is made from a fiber material such as wood cellulose, cotton, rayon, poly(ethylene terephthalate), poly(butylene terephthalate), polyacrylonitrile, or polypropylene. In specific embodiments, the substrate is a paper.

Various compositions and amounts are contemplated for the copolymer. As used herein, "copolymer" refers to a polymer made up of two or more monomers. In various embodiments, the copolymer may include an α-olefin and one or more acid-based monomers. The α-olefin may be, by way of example and not limitation, ethylene, propylene, isobutylene, 1-butene, 1-pentene, 1-hexene, 4-methyl-1-pentene, 1-octene, or combinations thereof. The acid-based monomer may be, by way of example and not limitation, acrylic acid, methacrylic acid, maleic acid and anhydride, itaconic acid, fumaric acid, crotonic acid and citraconic acid and anhydride, methyl hydrogen maleate, ethyl hydrogen maleate, ethyl acrylate, methyl methacrylate, ethyl methacrylate, methyl acrylate, isobutyl acrylate, methyl fumarate, vinyl acetate, vinyl propionate, vinyl benzoate, vinyl chloride, vinylidene chloride, acrylamide, acrylonitrile, methacrylonitrile, fumaronitrile, or combinations or derivatives thereof. In some embodiments, the copolymer includes ethylene and at least one acid-based monomer. In some particular embodiments, the copolymer includes ethylene and acrylic acid or methacrylic acid.

Various amounts of α-olefin and acid-based monomers in the copolymer are also contemplated. Without being bound by theory, the acid-based monomer provides tackiness to the coating composition. Thus, lowering the acid amount below about 20 wt % is often not considered suitable because a skilled person would not consider the adhesion provided by such a coating composition to be sufficient. However, in various embodiments, the acid-based monomer may be present in an amount of from about 5 mol % to about 30 mol % based on the copolymer. The acid-based monomer may be present in an amount of from about 10 wt % to about 25 wt %, from about 12.5 wt % to about 20 wt %, or even about 15 wt % based on the copolymer, depending on the particular embodiment. Some specific embodiments include the acid-based monomer in an amount of from about 5 wt % to about 18 wt % based on the copolymer, from about 12 wt % to about 22 wt % based on the copolymer, from about 10 wt % to less than about 20 wt % based on the copolymer, or from about 9 wt % to about 18 wt % based on the copolymer. Accordingly, the α-olefin may be present in an amount of from about 70 wt % to about 95 wt %, from about 75 wt % to about 90 wt %, from about 80 wt % to about 87.5 wt %, or even about 85 wt % based on the copolymer. In one particular embodiment, the copolymer includes about 15 wt % acrylic acid or methacrylic acid and about 85% ethylene.

Without being bound by theory, it was previously thought that the use of copolymers including a low acid amount (e.g., less than about 20 wt % of acid-based monomer based on the copolymer) would increase the viscosity, thereby creating processability issues and rendering the composition unsuitable for use as a primer or coating composition. In particular, a low melt index ($I_2$) of the copolymer is indicative of a high viscosity, which creates ineffective interaction with ink leading to poor ink adhesion. However, various embodiments described herein include copolymers with a melt index ($I_2$) of from about 1 g/10 minutes to about 2,000 g/10 minutes as measured at 190° C. and 2.16 kg as measured according to ASTM D1238 and remain suitable for application to various substrates as a primer. The copolymer of various embodiments has a melt index ($I_2$) of from about 1 g/10 minutes to about 2,000 g/10 minutes as measured at 190° C. and 2.16 kg as measured according to ASTM D1238 and a melting point of greater than about 65° C. In some embodiments, the copolymer has a melt index of from about 10 g/10 minutes to about 1,000 g/10 minutes as measured at 190° C., from about 20 g/10 minutes to about 100 g/10 minutes, from about 10 g/10 minutes to about 250 g/10 minutes, or even from about 30 g/10 minutes to about 65 g/10 minutes.

In various embodiments, the copolymer is an ionomer, such as an ionomer of ethylene and methacrylic acid or an ionomer of ethylene and acrylic acid. The ionomer may be formed by dispersing the copolymer with one or more neutralizing agents, including at least one fixed base, to form an aqueous dispersion of the ionomer. As used herein, the term "ionomer" refers to a copolymer including at least one acid-based monomer that has been at least partially neutralized by a metal-containing neutralizing agent. The aqueous dispersion may include from about 10 wt % to about 100 wt % of the copolymer based on solids, from about 15 wt % to about 75 wt % of the copolymer based on solids, from about 20 wt % to about 60 wt % of the copolymer based on solids, or even from about 30 wt % to about 40 wt % of the copolymer based on solids. The neutralizing agent may be, by way of example and not limitation, a fixed base or a blend of one or more fixed bases and an amine. More specifically, the neutralizing agent may be ammonia, potassium hydroxide, sodium hydroxide, 2-amino-2-methyl-1-propanol (AMP), a mono-, di-, or tri-valent metal base, or a blend thereof. In some embodiments, the neutralizing agent is a blend of potassium hydroxide and ammonia, potassium hydroxide and AMP, sodium hydroxide and ammonia, or sodium hydroxide and AMP. Without being bound by theory, a fixed base may be used to disperse the copolymers with low acid content and low melt indexes due to fewer available reactive sites and high viscosities. The fixed base is a stronger, more effective neutralizing agent compared to a weaker volatile amine such as ammonia.

In various embodiments, the neutralizing agent is present in an amount of greater than about 0.1% by volume based on the volume of the aqueous dispersion. However, the specific volume of neutralizing agent may vary depending on the particular embodiment, the desired level of neutralization, and the method of dispersion. In some embodiments, an amount of neutralizing agent sufficient to neutralize from about 10% to about 100% of available acid groups on the copolymer is employed. In other embodiments, an amount of neutralizing agent sufficient to neutralize from about 20% to about 95%, from about 30% to about 90%, or even from about 40% to about 80% of available acid groups on the copolymer is employed. In particular embodiments, neutralization levels may exceed 100% by adding excess neutralizing agent. Higher pH values minimize the need for preservatives in the water-based primer coating.

In various embodiments, the primer coating comprises greater than about 50 wt % ionomer based on the weight of the dried coating. For example, the primer coating may include from about 50 wt % to about 100 wt % ionomer, from about 50 wt % to about 90 wt % ionomer, from about 50 wt % to about 80 wt % ionomer, from about 50 wt % to about 70 wt % ionomer, from about 60 wt % to about 100 wt % ionomer, from about 60 wt % to about 90 wt % ionomer, from about 60 wt % to about 80 wt % ionomer, from about 70 wt % to about 100 wt % ionomer, or even from about 70 wt % to about 90 wt % ionomer based on the weight of the dried coating. In some embodiments, the ionomer is the component that makes up the largest wt % of the dried coating.

Various embodiments of the coating also include one or more co-binders. Without being bound by theory, the co-binder may help to make the coating more compatible with the substrate to which it is applied by decreasing the tackiness of the primer coating. The co-binder may also provide a cost-effective delivery mechanism for the primer. The co-binder may be, by way of example and not limitation, starch, polyvinyl alcohol, carboxymethyl cellulose, guar, natural gums, cellulose ethers, and combinations thereof. The co-binder may be present in an amount of from about 10 wt % to about 90 wt % based on the aqueous dispersion on a solids basis. In some embodiments, the co-binder is present in an amount of from about 25 wt % to about 75 wt % based on the aqueous dispersion on a solids basis. In particular embodiments, the co-binder may be present in an amount of from about 20 wt % to about 30 wt %, from about 45 wt % to about 55 wt %, or even from about 70 wt % to about 80 wt % based on the aqueous dispersion on a solids basis. In various embodiments, the co-binder is present in the formulation such that a ratio by weight of co-binder to copolymer is from 1:5 to 5:1. In some embodiments, the co-binder may be present in the formulation such that a ratio by weight of co-binder to copolymer is from 1:1 to 5:1 or from 1:5 to 1:1. In specific embodiments, the ratio by weight of co-binder to copolymer is from 1:1 to 3:1 or from 1:1 to 1:3. The particular co-binder employed may vary depending on the particular embodiment, and may particularly be selected depending on the substrate. For example, a starch may be selected as a co-binder for coatings intended for application to cellulose-based substrates, such as paper. In embodiment in which the co-binder is a starch, starch may be a modified starch, such as an ionic starch, an oxidized starch, an ethylated starch, or the like. Without being bound by theory, the modifications to the starch may increase the compatibility of the co-binder with the copolymer. For example, an ethylated starch may make the co-binder more compatible with the ethylene in the ethylene-acrylic acid copolymer. The starch to be modified may come from any plant source including corn, potato, sweet potato, wheat, rice, sago, tapioca, waxy maize, sorghum, high amylose corn, or the like. Suitable starches include those that are commercially available under the trademark Pen-Cote® (Penford Products, Cedar Rapids, Iowa).

In some embodiments, the primer coating may include one or more additional additives. For example, additives may include pigments, dyes, optical brighteners, crosslinkers, defoamers, anti-static agents, dispersants, thickeners, and preservatives. The primer coating also enhanced by using adhesion promoters such as polyurethanes, urea, stearates, PEI (polyethylene imine), crosslinkers, hydrogenated hydrocarbon rosin or rosin esters, acrylic polymer dispersions, and the like. Without being bound by theory, the adhesion promoter may aid in promoting adhesion of the primer coating to the substrate and/or promoting adhesion of the ink to the primer coating.

The primer coating may be deposited on a substrate by applying the primer coating to at least one major surface of the substrate and drying the coating. In various embodiments, the primer coating may be applied neat or as diluted with water. Application of the primer coating to the substrate may be achieved using any one of a variety of methods including, by way of example and not limitation, immersion, spray, rod or roller, or using equipment such as a size press, water box, blade coater, cast coater, rod coater, air knife coater, curtain coater, film press coater, flexo coater, and the like. The primer coating may be applied online with the paper machine or offline, depending on the embodiment.

Various embodiments described hereinabove result in a primer coating that meets or exceeds industry standards related to ink receptivity and blanket life. For example, various embodiments resulted in an unexpected improvement in ink receptivity despite the inclusion of ionomers and starch. For example, ionomers created from copolymers having low acid content and high viscosity may have ineffective interaction with ink leading to poor ink adhesion. However, as will be demonstrated below, primer coatings that included a starch blended with an aqueous dispersion of an ionomer formed by neutralizing an acid-based copolymer meet or exceed industry standards for ink adhesion.

EXAMPLES

The following examples are provided to illustrate various embodiments, but are not intended to limit the scope of the claims. All parts and percentages are by weight unless otherwise indicated.

Twenty grams (20 g) ethylene-acrylic acid copolymer (melt index ($I_2$) of 33, 15% acrylic acid monomer, available as Escor 5200 from Exxon Mobil, Antwerpen, Belgium) and a mixture of soft water, potassium hydroxide (KOH, available from Nexeo Solutions, Woodlands, Tex.), and ammonium hydroxide ($NH_4OH$, available from Univar Redmond, Wash.) were added into a reactor. The temperature of the reaction mixture was gradually increased to 120° C. and maintained between 120° C. and 130° C. for approximately 2.5 hours and the reaction mixture was stirred. After the cook time, the reactor was cooled to ambient temperature and the primer (Example 1) was collected as a slightly tan emulsion having a pH of from about 9.5 to about 10.8.

Additional Examples 2-4 were prepared in a similar manner to the method described above for Example 1. However, Examples 2-4 included different bases and blends of bases. Example 5 was prepared using ethylene-methacrylic acid (melt index ($I_2$) of 60, 15% methacrylic acid monomer, available as Nucrel 960 from DuPont, Wilmington, Del.) and a mixture of potassium hydroxide and AMP. Comparative Example 1 was also prepared in a similar manner as Example 1. However, Comparative Example 1 included ethylene acrylic acid (20% acrylic acid monomer) and only an amine base as a neutralizing agent. The amounts of each component for the primers of Examples 1-5 and Comparative Example 1 are presented in Table 1 in grams (g).

TABLE 1

Primer Compositions

| Material | Example 1 | Example 2 | Example 3 | Example 4 | Example 5 | Comp. Ex. 1 |
| --- | --- | --- | --- | --- | --- | --- |
| EAA (15% acrylic acid monomer) | 20 | 20 | 20 | 22 | 0 | 0 |
| EMA (15% methacrylic acid monomer) | 0 | 0 | 0 | 0 | 21 | 0 |
| EAA (20% acrylic acid monomer) | 0 | 0 | 0 | 0 | 0 | 35 |
| Water | 77.62 | 78.63 | 78.32 | 75.6 | 75.7 | 62.12 |
| KOH | 0.95 | 0 | 1.64 | 1.25 | 2.27 | 0 |
| $NH_4OH$ | 1.40 | 0 | 0 | 0 | 0 | 2.86 |

TABLE 1-continued

Primer Compositions

| Material | Example 1 | Example 2 | Example 3 | Example 4 | Example 5 | Comp. Ex. 1 |
|---|---|---|---|---|---|---|
| NaOH | 0 | 1.33 | 0 | 0 | 0 | 0 |
| AMP | 0 | 0 | 0 | 1.07 | 0.97 | 0 |
| pH | 9.5-10.8 | 10-11 | 9.5-10.5 | 9.7-10.7 | 10-11 | 7.5-8.5 |

As reported in Table 1, Examples 1-5 exhibited basic pHs (above 9), whereas the primer of Comparative Example 1 exhibited a nearly neutral pH. The pH can impact compatibility with co-binders. Also, using a fixed base to make an ionomer results in higher pH as the fixed base is a stronger, more reactive base functioning as a more effective neutralizing agent.

Each of primers of Examples 1-5 and Comparative Example 1 was mixed with 3 parts ethylated starch (Pen-Cote®, available from Penford Products, Cedar Rapids, Iowa) to one part primer (solids on solids). The starch and primer blends were then applied to both sides of an uncoated, wood-free, 55 lb base paper using a LabMaster Pilot laboratory coater (available from Faustel, Inc., Germantown, Wis.). The blends were applied at a target coat weight of 0.6 to 0.8 dry gsm of primer per side. The coated paper was dried using dryers on the LabMaster coater and subsequently calendared to a Sheffield smoothness of from about 70 to about 75.

Once dried and calendared, the coated papers were printed on a Hewlett-Packard Indigo 6600 press using various HP color block patterns. Ink adhesion was measured in accordance with ASTM F2252/F2252M using a tape-pull test at various time intervals. Ink adhesion results are presented in Table 2.

TABLE 2

Ink Adhesion Results from Commercial Print Trial

| | Ink Adhesion Results | Ink Adhesion Results | |
|---|---|---|---|
| | 5 minutes | 20 minutes | 24 hours |
| Example 1 | 85% | 85% | >95% |
| Example 2 | 85% | 90% | 90% |
| Example 3 | 85% | 85% | 95% |
| Example 4 | 85% | 85% | 95% |
| Example 5 | 85% | 85% | 95% |
| Comp. Ex. 1 | 70% | 70% | 75% |

Given the ink adhesion results presented in Table 2, various compositions which exhibited improved performance over Comparative Example 1 (e.g., Examples 1 and 5) were selected for additional testing. The results of the additional testing are shown in Table 3. In Table 3, a coated paper is indicated as "photo recommended" if the ink adhesion is above 80% after a maximum of 60 minutes.

TABLE 3

Ink Adhesion Results

| | 100% Black Ink Adhesion Results | 290% Photo Adhesion Results | |
|---|---|---|---|
| | 10 minutes | 10 minutes | Photo recommended? |
| Example 1 | 100% | 100% | Yes |
| Example 5 | 100% | 100% | Yes |
| Comparative Example 1 | 94% | 91% | Yes |

Examples 1 and 5 were mixed with ethylated starch, optical brightening agents (OBA), preservatives, ammonium hydroxide (to adjust the pH to be greater than about 8.5), water, defoamer, and other additives to optimize the runnability of the coatings on the paper machine size press. Specifically, Examples 1-5 were mixed with three parts starch to one part primer (solids on solids). Each blend was coated onto a wood free sheet with a basis weight of 148 gsm (100 lb. text grade) and dried on the paper machine. The paper was coated such that the primer coat weight was varied from about 13 lb/ton to about 23 lb/ton. The coated sheet was slit and sheeted, and then tested according to HP Certification Standards. The results of the testing are shown in Table 4.

TABLE 4

Testing Results

| | Actual Coat Weight (#/ton) | Blanket Life | 100% Black Ink Adhesion Results 10 Minutes | 290% Photo Adhesion Results 10 Minutes | Photo recommended? |
|---|---|---|---|---|---|
| Example 1 | 12.7 | ** | 91% | 80% | Yes |
| Example 1 | 18.2 | ** | 96% | 89% | Yes |
| Example 1 | 21.2 | *** | 97% | 94% | Yes |
| Example 5 | 22.3 | Fail | 95% | 91% | Yes |
| Comp. Ex. 1 | 21.0 | Fail | 98% | 97% | Yes |

As in Table 3, in Table 4 a coated paper is indicated as "photo recommended" if the ink adhesion is above 80% after a maximum of 60 minutes. The blanket life was measured by employing a blanket cleaner page. In Table 4, the blanket life is indicated as two stars () if the third red blanket cleaner page is clean and a slight blanket memory is observed at 12,000 impressions. The blanket life is indicated as three stars (*) if the first red blanket cleaner page is clean and there is very minor blanket memory for at least up to 12,000 impressions. Failure ("Fail") is indicated if the fifth red blanket cleaner page is not clean, or white is observed, and there is a severe lack of dots/cracks/glass memory. As shown in Table 4, Example 1 exhibits improved blanket life over Comparative Example 1 when coated at 21.2 lb/ton.

Additional primers were evaluated for ink adhesion results and compared with Comparative Example 1. In particular, EAA (20% acrylic acid monomer) was neutralized at varying amounts to prepare Examples 6-10. The neutralization level and base used for neutralization for each of Examples 6-10 is reported in Table 5. The bases included a fixed base to create ionomers (Examples 6, 7, and 8) or a combination of fixed base and volatile amine (Examples 9 and 10). Comparative Examples 1, 2, 3, and 4 included a volatile amine as a base.

Each of Examples 6-10 and Comparative Examples 1-4 was mixed with 3 parts ethylated starch (Pen-Cote®, available from Penford Products, Cedar Rapids, Iowa) to one part primer (solids on solids). The starch and primer blends were then applied to both sides of an uncoated, wood-free, 55 lb base paper using a LabMaster Pilot laboratory coater (available from Faustel, Inc., Germantown, Wis.). The blends were applied at a target coat weight of 0.6 to 0.8 dry gsm of primer per side. The coated paper was dried using dryers on the LabMaster coater and subsequently calendared to a Sheffield smoothness of from about 70 to about 75.

Once dried and calendared, the coated papers were printed on a Hewlett-Packard Indigo 6600 press using various HP color block patterns. Ink adhesion was measured in accordance with ASTM F2252/F2252M using a tape-pull test at various time intervals. Ink adhesion results are presented in Table 5.

Accordingly, without being bound by theory, various embodiments may provide a print primer coating that may improve ink adhesion and blanket life ratings as compared to dispersions formed by neutralizing the copolymer with volatile amines.

Moreover, as described hereinabove, coating formulations including a copolymer of ethylene and less than about 20 wt % of one or more acid-based monomers based on the copolymer may be used as a primer on various substrates, including cellulose-based substrates such as paper. In particular, various embodiments include from 5 wt % to 18 wt % acid-based monomers based on the copolymer, which conventionally were believed to result in a viscosity that was incompatible with use as a primer. However, various embodiments described herein demonstrate that a copolymer including a low amount of acid monomer (e.g., under about 20 wt % based on the copolymer) and a high viscosity (e.g., a melt index ($I_2$) of from about 1 g/10 minutes to about 1,000 g/10 minutes or more as measured at 190° C. and 2.16 kg according to ASTM D1238) provide improved ink adhesion when used on paper substrates.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

TABLE 5

Ink Adhesion Results from Pilot Coater Print Trial

| | Primer Coat Weight, dry gsm | Neutralization Level, % | Neutralizing Base | Ink Adhesion Results | | |
|---|---|---|---|---|---|---|
| | | | | 5 minutes | 20 minutes | 24 hours |
| Example 6 | 0.725 | 32 | KOH | 95% | 97% | 96% |
| Example 7 | 0.6 | 65 | KOH | 100% | 98% | 96% |
| Example 8 | 0.725 | 100 | KOH | 100% | 98% | 97% |
| Example 9 | 0.625 | 65 | 60% Ammonia & 40% KOH | 97% | 97% | 97% |
| Example 10 | 0.6 | 65 | 40% Ammonia & 60% KOH | 99% | 96% | 96% |
| Comp. Ex. 1 | 0.7 | <32 | Ammonia | 70% | 70% | 75% |
| Comp. Ex. 2 | 0.75 | 32 | Ammonia | 95% | 97% | 85% |
| Comp. Ex. 3 | 0.7 | 65 | Ammonia | 98% | 95% | 99% |
| Comp. Ex. 4 | 0.7 | 100 | Ammonia | 99% | 98% | 98% |

As demonstrated in Tables 1-5, the dispersions formed using fixed alkali or blended bases (fixed and amine bases) had higher absolute ink adhesion ratings than versions employing volatile amines. Additionally, these dispersions demonstrated similar or improved blanket compatibility ratings compared to the volatile amine versions. This data suggests that ionomers created using fixed alkali or blends of fixed alkali and amine bases provide improved ink adhesion and blanket life ratings than primers created using volatile amines.

As described hereinabove, a coating formulation including a blend of an ionomer-based copolymer of ethylene and one or more acid-based monomers provide improved ink adhesion. In various embodiments, the coating formulation may be deposited on the substrate using a size press.

Having described the embodiments in detail, it will be apparent that modifications and variations are possible without departing from the scope of the present disclosure defined in the appended claims. More specifically, although some aspects of the present disclosure are identified herein as preferred or particularly advantageous, it is contemplated that the present disclosure is not necessarily limited to these preferred aspects of the disclosure.

What is claimed is:
1. A primer coating formulation comprising:
an aqueous dispersion comprising a metal salt, about 15 wt % to about 75 wt % of a copolymer of ethylene and one or more acid-based monomers, and about 25 wt % to about 75 wt % of a co-binder;

wherein the one or more acid-based monomers are present in an amount of about 5 wt % to about 18 wt % based on the copolymer and the copolymer has a melt index ($I_2$) of about 1 g/10 minutes to about 1,000 g/10 minutes as measured at 190° C. and 2.16 kg according to ASTM D1238;

wherein the co-binder is selected from the group consisting of starch, polyvinyl alcohol, carboxymethyl cellulose, guar, natural gums, cellulose ethers, and combinations thereof; and wherein the copolymer is at least partially neutralized with a neutralizing agent comprising a blend of potassium hydroxide or sodium hydroxide and ammonia or AMP.

2. The primer coating formulation of claim 1, wherein the one or more acid-based monomers comprise acrylic acid, methacrylic acid, or combinations thereof.

3. The primer coating formulation of claim 2, wherein the one or more acid-based monomers are present in an amount of about 9 wt % to about 18 wt % based on the copolymer.

4. An aqueous dispersion comprising:
a blend of about 25 wt % to about 75 wt % of a co-binder selected from the group consisting of starch, polyvinyl alcohol, carboxymethyl cellulose, guar, natural gums, cellulose ethers, and combinations thereof and about 15 wt % to about 75 wt % of a copolymer formed by copolymerizing ethylene with an acid-based monomer and at least partially neutralizing to form an ionomer;

wherein the ionomer is formed with a neutralizing agent comprising a blend of potassium hydroxide or sodium hydroxide and ammonia or AMP.

5. The aqueous dispersion of claim 4, wherein the acid-based monomer is selected from the group consisting of acrylic acid, methacrylic acid, maleic acid, maleic anhydride, itaconic acid, fumaric acid, crotonic acid, citraconic acid, citraconic anhydride, methyl hydrogen maleate, and ethyl hydrogen maleate.

6. The aqueous dispersion of claim 4, wherein the aqueous dispersion comprises greater than about 0.1% by volume of the neutralizing agent.

7. The aqueous dispersion of claim 4, wherein about 10% to about 100% of available acid groups on the copolymer are neutralized.

8. The aqueous dispersion of claim 4, wherein the copolymer comprises about 5 mol % to about 30 mol % of the acid-based monomer.

9. The aqueous dispersion of claim 4, wherein the copolymer has a melt index ($I_2$) of about 10 g/10 minutes to about 250 g/10 minutes as measured at 190° C. and 2.16 kg according to ASTM D1238.

10. A method comprising:
applying to a paper substrate an aqueous dispersion comprising about 15 wt % to about 75 wt % of a copolymer formed by copolymerizing ethylene with an acid-based monomer and at least partially neutralizing to form an ionomer, and about 25 wt % to about 75 wt % of a co-binder selected from the group consisting of starch, polyvinyl alcohol, carboxymethyl cellulose, guar, natural gums, cellulose ethers, and combinations thereof;

wherein the ionomer is formed with a neutralizing agent comprising a blend of potassium hydroxide or sodium hydroxide and ammonia or AMP.

11. The method of claim 10, wherein the copolymer has a melt index ($I_2$) of about 1 g/10 minutes to about 2,000 g/10 minutes as measured at 190° C. and 2.16 kg according to ASTM D1238.

12. The method of claim 10, wherein the copolymer comprises ethylene acrylic acid, ethylene methacrylic acid, or combinations thereof.

13. The method of claim 10, further comprising:
printing upon a coating formed from the aqueous dispersion on the paper substrate.

14. The method claim 10, wherein a coating formed from the aqueous dispersion upon the paper substrate comprises greater than about 50 wt % ionomer based on a weight of the coating.

* * * * *